(12) United States Patent
Merg et al.

(10) Patent No.: US 8,977,423 B2
(45) Date of Patent: Mar. 10, 2015

(54) METHODS AND SYSTEMS FOR PROVIDING VEHICLE REPAIR INFORMATION

(75) Inventors: Patrick S. Merg, Hollister, CA (US); R. Steven Brozovich, Campbell, CA (US)

(73) Assignee: Snap-on Incorporated, Kenosha, WI (US)

(*) Notice: Subject to any disclaimer, the term of this patent is extended or adjusted under 35 U.S.C. 154(b) by 153 days.

(21) Appl. No.: 13/478,305

(22) Filed: May 23, 2012

(65) Prior Publication Data
US 2013/0317694 A1 Nov. 28, 2013

(51) Int. Cl.
*G07C 5/00* (2006.01)
*G06F 19/00* (2011.01)

(52) U.S. Cl.
USPC ........ 701/31.4; 701/32.4; 701/32.7; 701/31.8

(58) Field of Classification Search
USPC .......... 701/29.1, 29.2, 29.4, 29.6, 31.3, 31.4, 701/31.5, 31.6, 31.8, 32.3, 32.4, 32.5, 32.7, 701/33.2, 33.4, 34.2, 34.4
See application file for complete search history.

(56) References Cited

U.S. PATENT DOCUMENTS

| | | | |
|---|---|---|---|
| 6,263,322 B1 | 7/2001 | Kirkevold | |
| 6,556,904 B1 | 4/2003 | Larson | |
| 7,092,937 B2 | 8/2006 | Morgan | |
| 8,010,567 B2 * | 8/2011 | Subramanyam et al. | 707/791 |
| 8,019,503 B2 | 9/2011 | Andreasen | |
| 2001/0037168 A1 * | 11/2001 | Hozuka et al. | 701/29 |
| 2002/0007237 A1 * | 1/2002 | Phung et al. | 701/33 |
| 2002/0193926 A1 * | 12/2002 | Katagishi et al. | 701/33 |
| 2004/0199542 A1 * | 10/2004 | Morgan et al. | 707/104.1 |
| 2005/0021294 A1 * | 1/2005 | Trsar et al. | 702/183 |
| 2005/0125117 A1 * | 6/2005 | Breed | 701/29 |
| 2008/0208609 A1 | 8/2008 | Preece | |
| 2009/0006476 A1 * | 1/2009 | Andreasen et al. | 707/104.1 |
| 2009/0276115 A1 | 11/2009 | Chen | |
| 2010/0057290 A1 * | 3/2010 | Brillhart et al. | 701/33 |
| 2010/0174446 A1 | 7/2010 | Andreasen | |
| 2011/0029186 A1 | 2/2011 | Ishikawa | |
| 2011/0246018 A1 | 10/2011 | Bertosa | |
| 2013/0159240 A1 * | 6/2013 | Singh et al. | 706/51 |

OTHER PUBLICATIONS

International Searching Authority, International Search Report for PCT/US2013/042017 mailed Aug. 20, 2013, 4 pages.

* cited by examiner

*Primary Examiner* — Jason Holloway
(74) *Attorney, Agent, or Firm* — McDonnell Boehnen Hulbert & Berghoff LLP

(57) ABSTRACT

Methods and systems for providing. In an example, the computing device may be configured to receive vehicle information including identification information of a vehicle and/or information describing condition of the vehicle. The computing device also may be configured to match the vehicle information to content of a vehicle repair database so as to identify repair information relating to the vehicle. The computing device further may be configured to receive geographic information identifying a geographic location relating to the vehicle. The computing device also may be configured to provide, to a communication network, a subset of the identified repair information based on the geographic information. The service advisor may be able to access the subset of the identified repair information on a display device coupled to the computing device.

31 Claims, 8 Drawing Sheets

METHODS AND SYSTEMS FOR PROVIDING VEHICLE REPAIR INFORMATION

BACKGROUND

Modern vehicles include electronic control modules and diagnostic systems for monitoring the status of associated vehicle equipment. Information conveyed by the diagnostic systems has become more standardized, assisting in the evaluation of vehicle conditions and identifying appropriate repair procedures.

A diagnostic tool may be connected to a Data Link Connector (DLC) to retrieve diagnostic trouble code(s) or DTC associated with a malfunction or problem that the vehicle is experiencing. A technician can use the retrieved DTC to look up information relating to the malfunction. The technician may look up the information in a repair manual or database storing information associated with the DTC to identify the malfunction or a possible component failure corresponding to the DTC.

SUMMARY

The present application discloses systems and methods for providing vehicle repair information. In one aspect, a method is described. The method may comprise receiving, at a computing device, vehicle information comprising one or more of (i) identification information of a vehicle, and (ii) information describing condition of the vehicle. The method also may comprise matching, by the computing device, the vehicle information to content of a vehicle repair database so as to identify repair information relating to the vehicle. The method further may comprise receiving, at the computing device, geographic information identifying a geographic location relating to the vehicle. The method also may comprise providing, from the computing device to a communication network, a subset of the identified repair information based on the geographic information.

In another aspect, a non-transitory computer readable medium having stored thereon instructions executable by a computing device to cause the computing device to perform functions is described. The functions may comprise receiving, from a communication network, vehicle information comprising one or more of (i) identification information of a vehicle, and (ii) information describing condition of the vehicle. The functions also may comprise matching the vehicle information to content of a vehicle repair database so as to identify repair information relating to the vehicle. The functions further may comprise receiving, from the communication network, geographic information identifying a geographic location relating to the vehicle. The functions also may comprise providing, to the communication network, a subset of the identified repair information based on the geographic information.

In still another aspect, a system is described. The system may comprise a vehicle repair database including one or more of (i) information relating to prior experience of repairing vehicles, and (ii) original equipment manufacturer vehicle information including component-specific information. The system also may comprise a computing device coupled to the vehicle repair database. The computing device may include a non-transitory computer readable storage device storing computer readable instructions, a processor configured to execute the computer readable instructions, and a communication device configured to transmit data to a communication network and to receive given data from the communication network. The computing device may be configured to receive, from the communication network, vehicle information comprising one or more of (i) identification information of a vehicle, and (ii) information describing condition of the vehicle. The computing device also may be configured to identify repair information relating to the vehicle based on matching of the vehicle information to content of the vehicle repair database. The computing device further may be configured to receive, from the communication network, geographic information identifying a geographic location relating to the vehicle. The computing device also may be configured to provide, to the communication network, a subset of the identified repair information based on the geographic information.

In yet another aspect a method is described. The method may comprise providing to a communication network, by a computing device, vehicle information comprising one or more of (i) identification information of a vehicle, and (ii) information describing condition of the vehicle. The method also may comprise providing to the communication network, by the computing device, geographic information identifying a geographic location relating to the vehicle. The method further may comprise receiving from the communication network, at the computing device, repair information based on the vehicle information and the geographic information.

In yet still another aspect, a system is described. The system may comprise a display device. The system also may comprise a computing device coupled to the display device. The computing device may include a non-transitory computer readable storage device storing computer readable instructions, a processor configured to execute the computer readable instructions, and a communication device configured to transmit data to a communication network and to receive given data from the communication network. The computing device may be configured to provide, to the communication network, vehicle information comprising one or more of (i) identification information of a vehicle, and (ii) information describing condition of the vehicle. The computing device also may be configured to provide, to the communication network, geographic information identifying a geographic location relating to the vehicle. The computing device further may be configured to receive, from the communication network, repair information based on the vehicle information and the geographic information. The computing device also may be configured to generate a display of the repair information on the display device.

The foregoing summary is illustrative only and is not intended to be in any way limiting. In addition to the illustrative aspects, embodiments, and features described above, further aspects, embodiments, and features will become apparent by reference to the figures and the following detailed description.

DETAILED DESCRIPTION

The following detailed description describes various features and functions of the disclosed systems and methods with reference to the accompanying figures. In the figures, similar symbols identify similar components, unless context dictates otherwise. The illustrative system and method embodiments described herein are not meant to be limiting. It may be readily understood that certain aspects of the disclosed systems and methods can be arranged and combined in a wide variety of different configurations, all of which are contemplated herein.

In an example, a computing device (e.g., a server) may be configured to receive a search query relating to a vehicle repair issue (e.g., a diagnostic trouble code (DTC)) from a technician searching for information about the vehicle repair issue. The computing device may be configured to search a vehicle repair database based on the search query and provide search results to the technician. The search results may include general information about the repair issue, potential fixes, etc. The vehicle repair issue, however, may be specific to a given geographic location. As an example, a malfunction that a vehicle is experiencing may be a result of cold weather at a given geographic region. The same malfunction may not be experienced in another region characterized by hot weather, for example. Therefore, providing region-specific repair information based on a geographic location of the vehicle may focus the search results and may help diagnose and repair the malfunction more efficiently.

In an example, the computing device may be configured to receive vehicle information including identification information of a vehicle and/or information describing condition of the vehicle. The computing device also may be configured to match the vehicle information to content of a vehicle repair database so as to identify repair information relating to the vehicle. The vehicle repair database may, for example, include information relating to prior experience of repairing vehicles and/or original equipment manufacturer vehicle information including component-specific information. The computing device further may be configured to receive geographic information identifying a geographic location relating to the vehicle. The computing device also may be configured to provide, to a communication network, a subset of the identified repair information based on the geographic information. The computing device further may be configured to generate a display of the subset of the identified repair information on a display device coupled to the computing device.

Figure 1A:
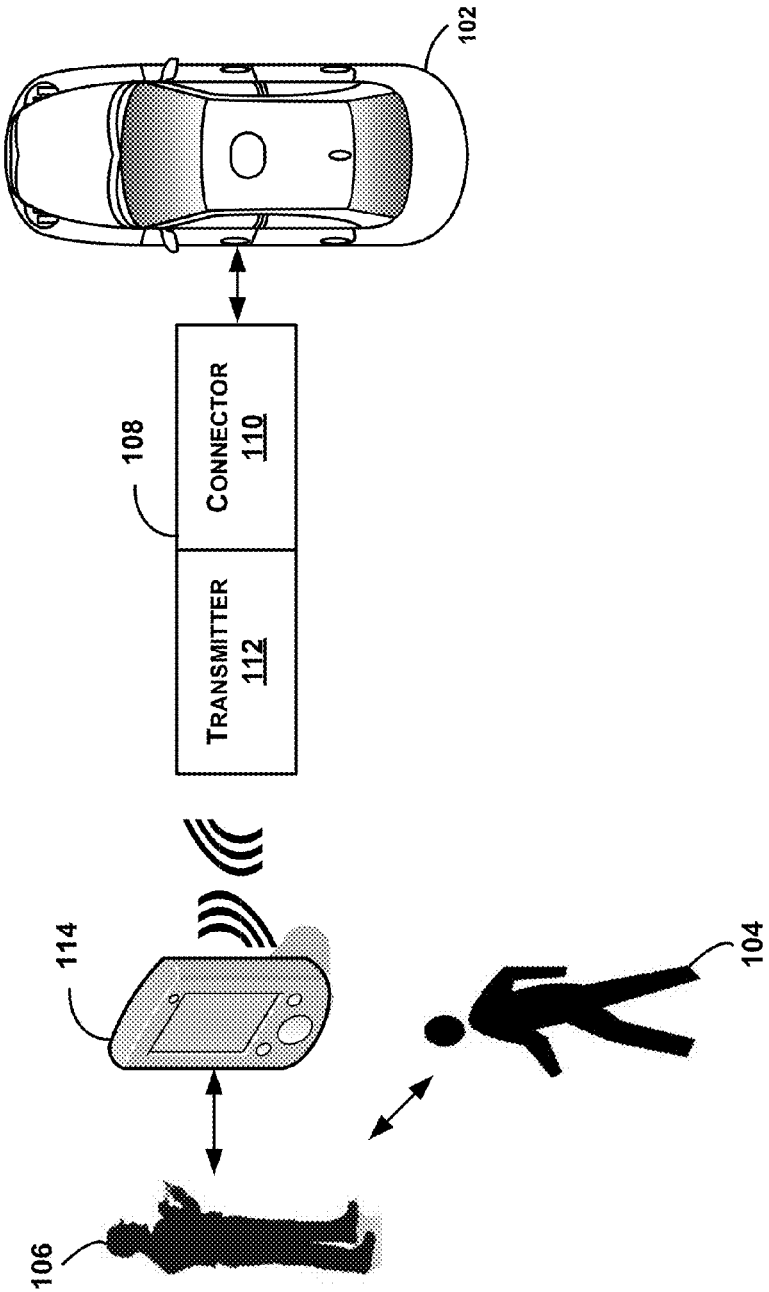
FIGS. 1A-1B illustrate example systems for providing vehicle repair information, in accordance with example embodiments.
Figure 1B:
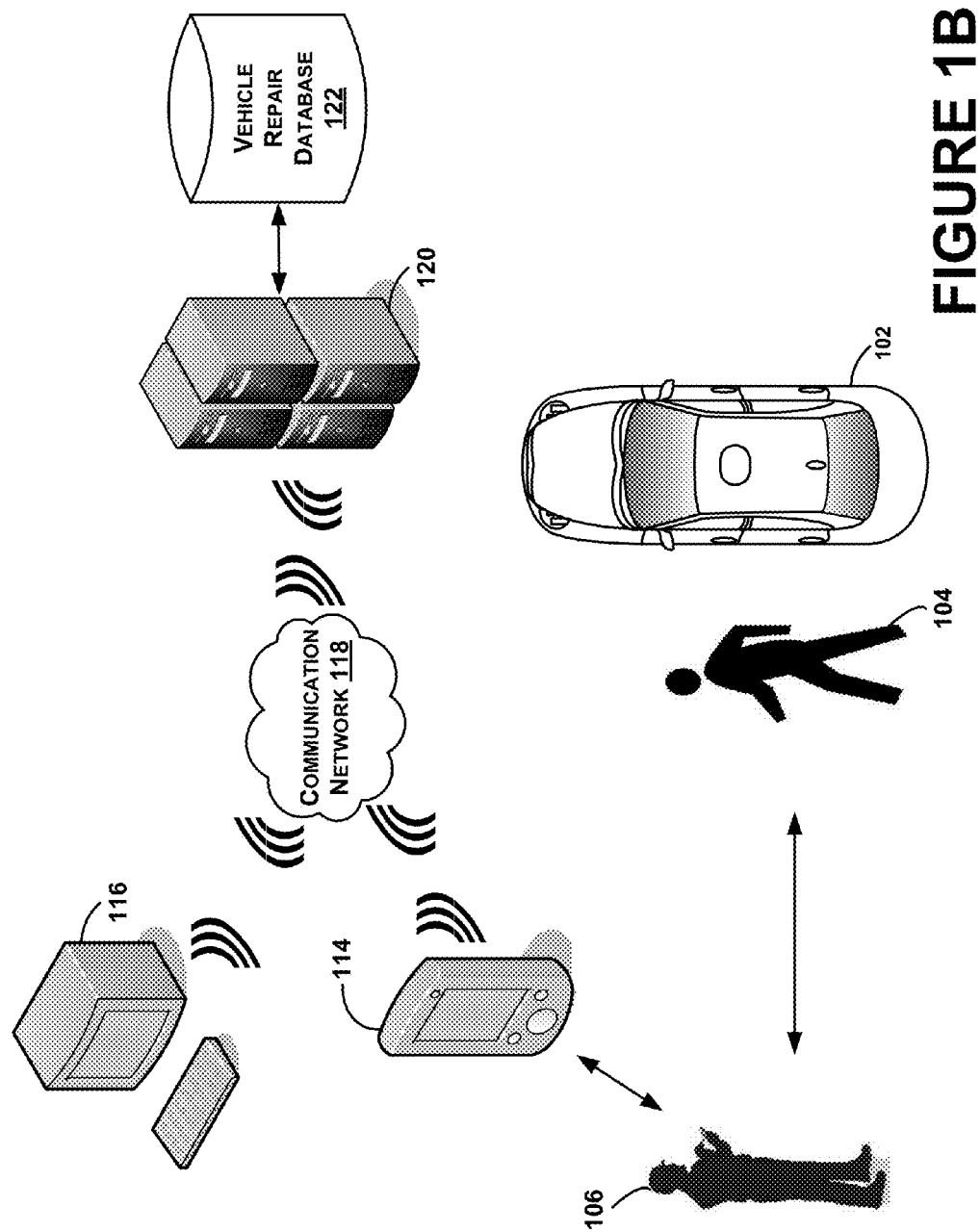

Referring now to the figures, FIGS. 1A-1B illustrate example systems for providing vehicle repair information, in accordance with example embodiments. The example systems may include several different components and subsystems. Components and subsystems of the example systems may be configured to work in an interconnected fashion with each other and/or with other components coupled to respective systems.

Referring to FIG. 1A, a vehicle 102 may experience a malfunction or any other issue that may require adjustment or repair, or may be due for routine maintenance as part of a maintenance schedule, for example. An example vehicle may take a form of an automobile. Alternatively, a vehicle control system may be implemented in or take the form of other vehicles, such as trucks, motorcycles, buses, boats, airplanes, helicopters, lawn mowers, recreational vehicles, amusement park vehicles, farm equipment, construction equipment, trams, golf carts, trains, and trolleys.

The embodiments described herein may include or be utilized with any appropriate voltage or current source, such as a battery, an alternator, a fuel cell, and the like, providing any appropriate current and/or voltage, such as about 12 Volts, about 42 Volts and the like.

The embodiments described herein may be used with any desired system or engine. Those systems or engines may comprises items utilizing fossil fuels, such as gasoline, natural gas, propane and the like, electricity, such as that generated by battery, magneto, fuel cell, solar cell and the like, wind and hybrids or combinations thereof. Those systems or engines may be incorporated into other systems, such as an automobile, a truck, a boat or ship, a motorcycle, a generator, an airplane and the like.

An owner 104 of the vehicle 102 may drive the vehicle to a repair shop to obtain help diagnosing and repairing the malfunction, for example. The owner 104 may be greeted by a service advisor 106 who may connect a diagnostic tool 108 through a connector 110 to the vehicle 102. For example, the diagnostic tool 108 may be connected to the vehicle 102 to retrieve vehicle identification information such as year, make, model, and engine type of the vehicle 102. Also, the diagnostic tool 108 may be connected to a vehicle electronic control module (e.g., engine control module, transmission control module, ABS control module, etc.) to detect the malfunction (e.g., retrieve a DTC indicative of the malfunction).

The diagnostic tool 108 may be configured to communicate with the vehicle 102 over one or more communication protocols used in the vehicle 102 such as Controller Area Network (CAN), SAE (Society of Automotive Engineers) J1850, ISO 9141, Keyword 2000 and others.

The diagnostic tool 108 further may be configured to communicate through a transmitter 112 with a computing device 114 to provide vehicle identification or diagnostic information to the computing device 114. The computing device 114 can be, for example, a mobile telephone, personal digital assistant (PDA), laptop, notebook, or netbook computer, tablet computing device, etc. The diagnostic tool 108 may be configured to communicate with the computing device 114 over one or more communication protocols different from the one or more communication protocols used in the vehicle 102. The transmitter 112 may be in communication with the computing device 114 through a wired or wireless network connection.

In some examples, alternatively or additionally, the vehicle 102 may be configured to transmit the vehicle identification information and the diagnostic information directly to the computing device 114 without connecting the diagnostic tool 108 to the vehicle 102.

Additionally, the service advisor 106 may walk around the vehicle 102 to perform visual inspection of the vehicle 102, identify symptoms of the malfunction, interview the owner 104 to record a complaint associated with the malfunction, and log information describing condition of the vehicle to the computing device 114 to create a repair order, for example. The repair order may be created in an electronic format or may be prepared in paper format and manually entered into a computer or converted (e.g., scanned) to an electronic format.

Referring now to FIG. 1B, the computing device 114 may be configured to provide or transmit vehicle information (e.g., the identification information, the information describing the condition of the vehicle, the repair order, etc.) to a shop management computing device 116. In one example, the shop management computing device 116 may be configured to provide or transmit the vehicle information through a communication network 118 (e.g., network the internet) to a data center or server 120. In another example, the computing device 114 may be configured to provide the vehicle information, through the communication network 118, directly to the server 120. The communication network 118 may be wired or wireless and, at least a portion of the network 118, may be external to the server 120 and the computing devices 114 and 116). In some examples, the computing device 114 or the shop management computing device 116 may be configured to communicate directly with the server 120 through point-to-point links. The computing device 114, the shop management computing device 116, and the server 120 may each include a communication device that may be configured to transmit data to and receive any of the data discussed in this description from the communication network 118.

The data center or server 120 may be configured to be in communication with a vehicle repair database 122. The vehicle repair database 122 may include original equipment manufacturer (e.g., automakers or part suppliers) information including component-specific information such as component specification, wiring diagrams, diagnostic flow charts, calibration procedures, life expectancy, etc.

The vehicle repair database 122 also may include information relating to prior experience of repairing vehicles, for example. The information relating to prior experience of repairing vehicles may include, for example, repair information of repair cases collected from repair shops. Repair orders associated with the repair cases may have been prepared in electronic format or may have been prepared in paper format then manually entered into the vehicle repair database 122 or converted (e.g., scanned) into an electronic format that can be stored in the vehicle repair database 122.

In an example, vehicle repair information (e.g., symptoms, repair order, successful vehicle fixes, etc.) may be stored in local computing systems of repair shops (service centers, dealerships, etc.) and may be backed up and transmitted to the data center or server 120 and stored in the vehicle repair database 122 on a frequent basis. By regularly transmitting updated information (e.g., new repair cases) to the vehicle repair database 122, content of the vehicle repair database 122 may remain updated with latest fixes solutions, and component information, for example.

The server 120 may be configured to match the received vehicle information to content of the vehicle repair database 122 to mine information stored in the vehicle repair database 122 and identify or determine repair information relating to the vehicle.

In an example, matching the received vehicle information to the content of the vehicle repair database 122 may include searching the vehicle repair database 122 to match and correlate keywords or combinations of keywords in the repair order along with other vehicle information (e.g., vehicle's model year, make, and model, mileage or odometer reading, etc.) to content of stored repair cases to determine prioritized fixes, relevant component test procedures, etc. In another example, matching the received information to the content of the vehicle repair database 122 may include mapping the vehicle information to tables or other databases comprising repair test procedures, prioritized fixes, part replacement statistics, etc. to retrieve relevant repair information. The vehicle repair database 122 may be configured or arranged to facilitate matching the received vehicle information to the content of the vehicle repair database 122.

The repair information may include, for example, tips, solutions, potential fixes, a list of parts that may need to be replaced, test procedures, wiring diagrams, repair procedures, questions and answers related to the condition of the vehicle, etc.

In an example, the server 120 further may be configured to receive geographic information identifying a geographic location relating to the vehicle 102. For example, one or both of the computing device 114 and the shop management computing device 116 may be configured to include Global Positioning System (GPS) sensor that may be configured to a provide to the server 120 information identifying a location (e.g., longitude and latitude) of the computing device 114, or the shop management computing device 116, and/or the vehicle 102 to which the computing device 114, or the shop management computing device 116 may be connected.

In one example, a repair order transmitted to the server 120, via the computing device 114 or the shop management computing device 116 for example, may include a zip code or mailing code for the shop identifying a region where the repair shop and the vehicle 102 being serviced at the repair shop are located. In another example, the vehicle 102 may include a GPS sensor that may be configured to provide the geographic information directly to the server 120. These examples are for illustration only. Other means for providing the server 120 with geographic information identifying the geographic location are possible.

A given region may refer to an area encompassed within or defined by a given zip code, phone area code, mailing code, or a given area within a predetermined distance from the identified geographic location (e.g., the location of the vehicle 102 or the repair shop). A size of the given region may be defined or selected by a user (e.g., a technician) or may be preselected or predetermined by a given computing device (e.g., the server 120, the computing device 114, or the shop management computing device 116).

In some examples, the geographic location relating to the vehicle 102 may not be a current location of the vehicle 102 or the repair shop where the vehicle 102 is being serviced. As an example, the geographic information may include information identifying an original sale location of the vehicle 102. The vehicle 102 may be serviced at a repair shop in Ohio, the United States but may have originally been purchased in California, the United States and may, thus, include special components and subsystems that are specific to California.

In one example, the geographic information may also include information identifying locations at which the vehicle 102 was previously driven. In another example, the geographic information may include information identifying locations or regions that are similar to the location of the vehicle 102 in weather conditions, altitude, etc. In still another example, the geographic information may include information identifying a given location that may have had weather conditions similar to given weather conditions on a date or time of year that the vehicle 102 started showing symptoms of the malfunction.

The server 120, thus, may be configured to provide through the communication network 118 a subset of the identified repair information based on the geographic location. The subset of the identified repair information may provide, for example, region-specific information to the technician assigned to repair the vehicle 102 to focus the technician's effort instead of providing a wide scope of repair information.

As an example, the server 120 may be configured to receive the vehicle information and the geographic information identifying the geographic location of the vehicle 120, and may be configured to match the received information to a given repair order information and associated weather information previously stored from a different repair case where the weather conditions associated with the given repair order previously stored may be similar to given weather conditions at the geographic location of the vehicle 102 being currently serviced. The server 120, accordingly, may provide focused repair information based on the vehicle information and the geographic information to the computing device 114 or another computing device at the repair shop for use by a given technician assigned to repair the vehicle 102.

Respective repair information and results related to repairing the vehicle 102 may be stored in the vehicle repair database 122 to build a continuously updated repository of knowledge and experience in the vehicle repair database 122 for reference in future repair cases.

Figure 2:
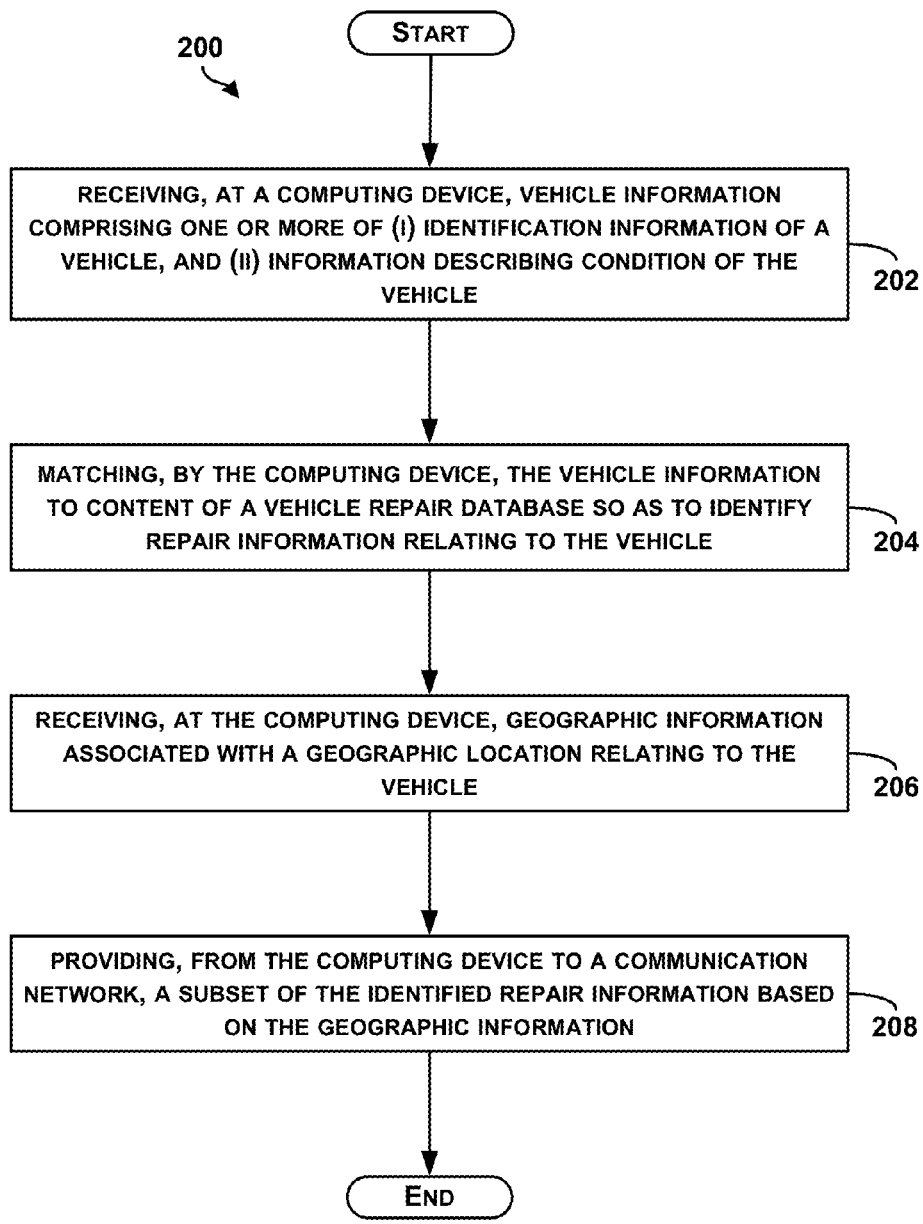
FIG. 2 is a flow chart of an example method to provide vehicle repair information, in accordance with an example embodiment.

FIG. 2 is a flow chart of an example method 200 to provide vehicle repair information, in accordance with an example embodiment. The method 200 described in FIG. 2 may, for example, be used by the example systems described in FIGS. 1A-1B and may be implemented by a server computing device such as the server 120 described in FIG. 1B.

The method 200 may include one or more operations, functions, or actions as illustrated by one or more of blocks 202-208. Although the blocks are illustrated in a sequential order, these blocks may in some instances be performed in parallel, and/or in a different order than those described herein. Also, the various blocks may be combined into fewer blocks, divided into additional blocks, and/or removed based upon the desired implementation.

In addition, for the method 200 and other processes and methods disclosed herein, the flowchart shows functionality and operation of one possible implementation of present embodiments. In this regard, each block may represent a module, a segment, or a portion of program code, which includes one or more instructions executable by a processor for implementing specific logical functions or steps in the process. The program code may be stored on any type of computer readable medium or memory, for example, such as a storage device including a disk or hard drive. The computer readable medium may include a non-transitory computer readable medium, for example, such as computer-readable media that stores data for short periods of time like register memory, processor cache and Random Access Memory (RAM). The computer readable medium may also include non-transitory media or memory, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a computer readable storage medium, a tangible storage device, or other article of manufacture, for example.

In addition, for the method 200 and other processes and methods disclosed herein, each block in FIG. 2 may represent circuitry that is wired to perform the specific logical functions in the process.

At block 202, the method 200 includes receiving, at a computing device, vehicle information comprising one or more of (i) identification information of a vehicle, and (ii) information describing condition of the vehicle. The computing device may, for example, include the server 120 described in FIG. 1B. In an example, the identification information of the vehicle may include one or more of model year, year of manufacture, make, and model (YMM) of the vehicle. Additionally, the identification information may include engine type and/or vehicle identification number (VIN), which may be indicative of location of manufacture of the vehicle, vehicle attributes, model year of the vehicle, a manufacturer identifier, manufacturing plant code, etc.

In an example, a diagnostic or scan tool may be connected to the vehicle to determine or retrieve the identification information. In this example, the diagnostic tool may be configured to transmit the identification information to a communication network, and the computing device (e.g., the server 120) may be configured to receive the information from the communication network. In another example, the vehicle may be configured to transmit the identification information directly through the communication network to the computing device.

Additionally or alternatively, the computing device may be configured to receive information describing condition of the vehicle. The information describing condition of the vehicle may, for example, include odometer reading (i.e., mileage driven by the vehicle), a diagnostic trouble code (DTC), and description of symptoms of a malfunction that the vehicle may be experiencing. The description of symptoms may for example be a record of a customer complaint.

In an example, the diagnostic tool may be connected to a vehicle electronic control module to retrieve the DTC indicative of the malfunction or type of malfunction. The information describing the condition of the vehicle may also be transmitted through the communication network and received at the computing device.

In another example, the information describing the condition of the vehicle provided by the computing device may include vehicle On-Board Diagnostic Parameter Identifiers (PIDs) and one or more values associated with each PID (PID values). As an example, a PID may include a parameter identifier that can be used to request (e.g., through a diagnostic tool and a DLC) PID values from electronic control modules of the vehicle, and the PID values may indicate, for example, fuel system status, engine coolant temperature, fuel trim, fuel pressure, engine revolutions/minute (RPMs), vehicle speed, timing advance, and intake air temperature. Other example PID values are possible as well.

In still another example, the information describing the condition of the vehicle may include vehicle freeze frame data. Freeze frame data, for example, may include readings or output of vehicle sensors obtained at a given point in time when a malfunction is detected and/or a DTC is set by an ECU or shortly thereafter (for example, within 100 ms of the DTC being set). As an example, the freeze frame data may include a record of engine condition (e.g., fuel system, calculated load, engine coolant temperature, fuel trim, engine speed, vehicle speed, etc.) when the malfunction is detected and/or a DTC is set by an ECU.

At block 204, the method 200 includes matching, by the computing device, the vehicle information to content of a vehicle repair database so as to identify repair information relating to the vehicle. The computing device (e.g., the server 120 in FIG. 1B) may be configured to be in communication with a vehicle repair database (e.g., the vehicle repair database 122 in FIG. 1B) that may include information relating to prior experience of repairing vehicles, for example. The vehicle repair database may also include original equipment manufacturer (e.g., automakers or part suppliers) vehicle information including component-specific information. The vehicle repair database may be updated on a frequent basis with new repair cases and component information to ensure that content of the vehicle repair database is up to date.

In another example, the vehicle repair database may include vehicle diagnostic baseline data. Vehicle diagnostic baseline data may include, for example, reference data that are recorded during an interval of malfunction-free operation of the vehicle. In an example, the reference data can include data provided by an original equipment manufacturer (OEM) regarding recommended operating condition of the vehicle. In some examples, a data logger can be installed on the vehicle to collect the reference data (e.g., sensor output data). In an example, respective reference data from a number of vehicles similar to the vehicle (e.g., same YMM, etc.) can be combined and/or aggregated into a set of aggregated data. The aggregation process can include determining a classification and/or reliability for the aggregated data. The reference data for the vehicle and other data can used to generate baseline data for the vehicle. The baseline data may include a statistical summary over data taken for vehicles that share core-vehicle information (e.g., YMM, and/or ECU type/release information). The baseline data can get aggregated and/or updated over time. For example, as more data is aggregated for vehicles under service that share core-vehicle information, the baseline data can have higher confidence values and/or intervals for aggregated baseline data over time. Collection and generation of vehicle diagnostic baseline data are described in U.S. patent application Ser. No. 13/031,565, filed on Feb. 21, 2011, and entitled "Diagnostic Baselining," which is herein incorporated by reference as if fully set forth in this description.

In one example, the reference data or baseline data may be collected and saved at the repair shop or service facility where the vehicle is and has been serviced overtime and may be provided to the vehicle repair database on a frequent basis. In an example, the server may be configured to compare the information describing the condition of the vehicle to the baseline data to determine a current malfunction of the vehicle and, accordingly, identify the vehicle repair information.

In some examples, for each of the vehicle repair cases, the computing device may be configured determine a given location of a given vehicle associated with that repair case (e.g., through a zip code or mailing code of a repair shop repairing the given vehicle) to request weather information related to weather conditions at the given location of the given vehicle. For example, the computing device may be configured to request the weather information from a third party (e.g., the National Oceanic and Atmospheric Administration's National Weather Service) through the internet. The computing device may be configured to receive the requested weather information, associate the requested weather information with the repair order and store the repair order and associated weather information in the vehicle repair database. Therefore, the vehicle repair database may be configured to store each vehicle repair case (e.g., repair order content, attempted fixes, successful fixes, etc.) in addition to weather information associated with that vehicle repair case. The weather information may include, for example, temperature, barometric pressure, humidity, precipitation, etc.

The computing device may be configured to match the received vehicle information to the content of the vehicle repair database to mine information stored in the vehicle repair database and identify or determine repair information relating to the vehicle.

The repair information may include, for example, tips, solutions, potential fixes, a list of parts that may need to be replaced, test procedures, repair procedures, questions and answers related to the condition of the vehicle, etc. In an example, the computing device may be configured to match keywords or combinations of keywords in the repair order along with other vehicle information (e.g., vehicle's YMM, mileage or odometer reading, etc.) to content of stored repair cases to determine prioritized fixes, relevant component test procedures, etc. Those skilled in the art will appreciate that other algorithms and arrangements and other elements can be used for matching the vehicle information to the content of the vehicle repair database.

In an example, upon receiving the identification information of the vehicle and an odometer reading (i.e., current mileage), the computing device may be configured to match the identification information and the odometer reading to the content of the vehicle repair database to identify or predict a common problem, malfunction, or a component (e.g., sensor) failure expected to occur without receiving the information describing the condition of the vehicle.

A level of details and applicability of the identified repair information may be commensurate with a given level of details and accuracy of the vehicle information received at the computing device.

At block 206, the method 200 includes receiving, at the computing device, geographic information identifying a geographic location relating to the vehicle. The computing device further may be configured to receive geographic information (e.g., longitude and latitude) identifying a geographic location relating to the vehicle such as a location of the vehicle or the repair shop where the vehicle is being repaired.

In one example, the geographic information may include information identifying an original sale location of the vehicle. The vehicle may be serviced at a repair shop in Ohio but may have originally been purchased in California and may, thus, include special components and subsystems that are designed to meet California's emissions requirements, for example.

In another example, the geographic information may also include information identifying locations at which the vehicle was previously driven. In another example, the geographic information may include information identifying locations that are similar to the location of the vehicle in weather conditions, altitude, etc.

In still another example, the geographic information may include information identifying a given location that may have had weather conditions similar to given weather conditions on a date or time of year that the vehicle 102 started showing symptoms of the malfunction.

In yet another example, the computing device may be configured to receive the vehicle information through the internet and may be configured to identify the location of the vehicle or the repair shop from the Internet Protocol (IP) address from which the vehicle information is received.

At block 208, the method 200 includes providing, from the computing device to a communication network, a subset of the identified repair information based on the geographic information. As described above at block 204, the computing device may be configured to match the vehicle information to the content of the vehicle repair database to identify repair information relating to the vehicle. The identified repair information may include a wide scope of information and the computing device may be configured to determine a subset of the identified repair information based on the geographic information. The subset of repair information may, thus, be tailored or specific to an environment of the vehicle in addition to the condition of the vehicle. The subset of repair information may represent data obtained by filtering the identified repair information by geographic location.

In another example, instead of identifying repair information based on the vehicle information and then determining the subset of repair information from the identified repair information based on the geographic location, the computing device may be configured to receive the vehicle information; receive the geographic information; and match both the vehicle information and the geographic information to the content of the vehicle repair database to determine a set of repair information tailored to the vehicle.

For example, the geographic information may identify a given original sale location of the vehicle that may be indicative of special components or subsystems coupled to the vehicles. The computing device may be configured to match the geographic information as well as the vehicle information to the content of the vehicle repair database to identify a focused set of repair information that is specific to the vehicle being repaired.

In another example, weather conditions may have a noticeable influence on a type of malfunction or problem the vehicle may be experiencing. For example, the vehicle may be driven in winter in a cold location and may experience cold-related vehicle problems. The computing device may be configured to receive the geographic information that is indicative of the location of the vehicle and receive information related to associated weather conditions. Based on such information, the computing device may be configured to provide the subset of the identified repair information that may be take into account the associated weather conditions.

In addition to or alternative to weather conditions, an altitude at which the vehicle may be driven may have an influence on the type of malfunction of problem the vehicle may be experiencing. The computing device may be configured to receive the geographic information indicative of the altitude at a given location where the vehicle experienced a given problem and may be configured, accordingly, to provide the subset of repair information.

As an example for illustration, the vehicle may be at a repair shop in Dallas, Tex., United States, but may have started experiencing a given malfunction or problem in Denver, Colo., United States. The computing device may be configured to receive such information associated with a driving history of the vehicle (history of locations at which the vehicle may have been driven) and may accordingly provide the subset of repair information that takes into account Denver's environment (e.g., altitude, weather conditions, etc.).

In still another example, the vehicle repair database may not include given repair information relevant to a given location of the vehicle. However, the vehicle repair database may include respective repair information associated to a respective location that may be similar to the given location of the vehicle being repaired in weather conditions or altitude, for example. Providing respective repair information associated with the respective location may be relevant to the given location of the vehicle.

Thus, the computing device may be configured to provide the subset of the identified repair information including region-specific information that takes into account the environment or circumstances of the vehicle being repaired. The computing device may be configured to provide the subset of the identified repair information, through the communication network, to another computing device that may be located at the given location at which the vehicle is being repaired.

Figure 3:
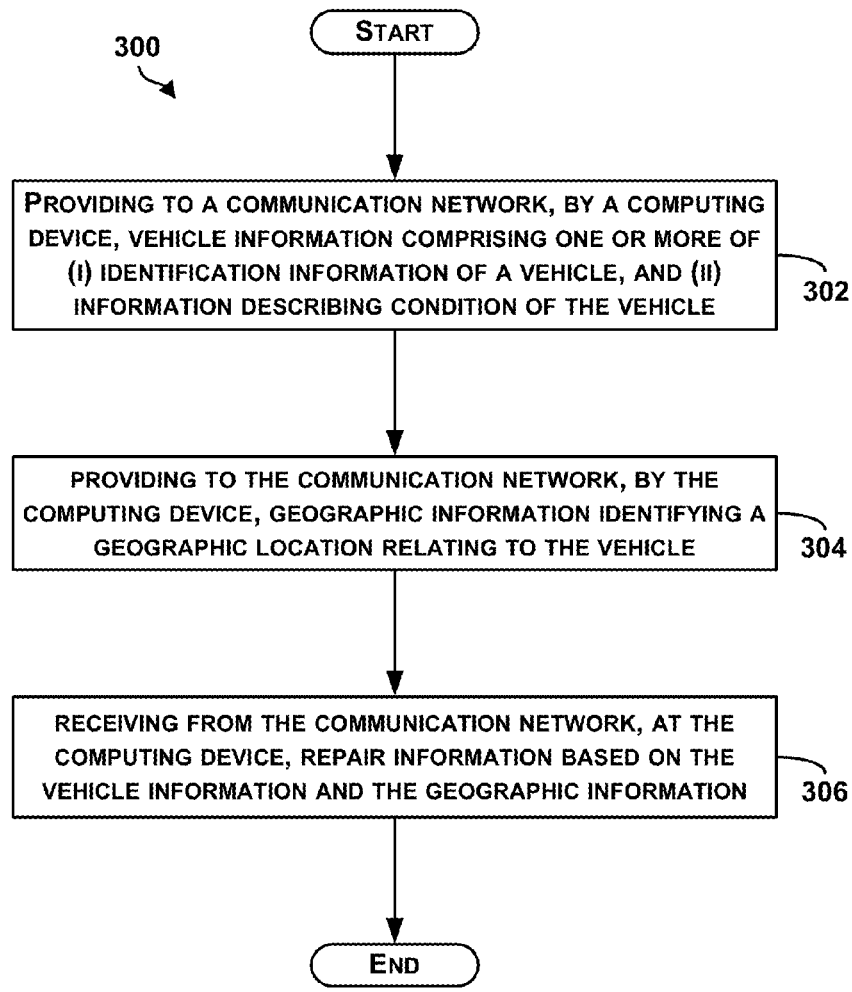
FIG. 3 is a flow chart of another example method to provide vehicle repair information, in accordance with an example embodiment.

FIG. 3 is a flow chart of another example method 300 to provide vehicle repair information, in accordance with an example embodiment. The method 300 described in FIG. 3 may, for example, be used by the example systems described in FIGS. 1A-1B and may be implemented by a client computing device communicating with a server side computing device. Examples of the client computing device may include the computing device 114, the shop management computing device 116, any other computing device at the repair shop that may be accessed by a technician assigned to repair a given vehicle, or a personal computing device used by a customer requiring information on repairing the given vehicle.

At block 302, the method 300 includes providing to a communication network, by a computing device, vehicle information comprising one or more of (i) identification information of a vehicle, and (ii) information describing condition of the vehicle. As described above with respect to block 202 of the method 200, the identification information of the vehicle may include one or more of year of manufacture, make, model (YMM) of the vehicle, and VIN. The computing device may be configured to receive the identification information and provide the identification information through a communication network to a server at a remote location, for example.

Additionally or alternatively, the computing device may be configured to provide to the server information describing condition of the vehicle. The information describing condition of the vehicle may, for example, include odometer reading (i.e., mileage driven by the vehicle), a diagnostic trouble code (DTC), Parameter IDs (PIDs) and PID values, frame freeze data, sensor output data, and symptoms of a malfunction that the vehicle may be experiencing. The symptoms may for example be a record of a customer complaint that may be described in a repair order. The information describing condition of the vehicle may be received at the computing device through the diagnostic tool coupled to the computing device and connected to an electronic vehicle control module to download the information. The computing device may be configured to provide the information to the server.

At block 304, the method 300 includes providing to the communication network, by the computing device, geographic information identifying a geographic location relating to the vehicle. For example, a GPS sensor/module may be coupled to the computing device and the sensor or module may be configured to provide to the computing device information identifying a location of the computing device and/or the repair shop where the vehicle is being serviced. The computing device further may be configured to provide to the server through the communication network the information identifying the location. In one example, in addition or alternative to using the GPS sensor, the computing device may be configured to provide location information (e.g., zip code) of the repair shop with the vehicle information provided to the server. In still another example, the vehicle may include a GPS sensor that may be configured to provide the geographic information directly to the server. These examples are for illustration only. Other means for providing the server with geographic information identifying the geographic location are possible.

In addition or alternative to providing the location of the repair shop or the vehicle being serviced, the computing device may provide information identifying an original sale location, locations associated with a driving history of the vehicle, etc. As described above with respect to the method 200 in FIG. 2, the server may be configured to receive other information (e.g., weather information) associated with the geographic information provided by the computing device.

At block 306, the method 300 includes receiving from the communication network, at the computing device, repair information based on the vehicle information and the geographic information. As described above with respect to the method 200 in FIG. 2, the server may be configured to match the vehicle information and the geographic information, provided by the computing device, to content of a vehicle repair database to identify repair information. The computing device may be configured to receive the repair information from the server through the communication network.

The computing device further may be configured to generate a display of or visually present the repair information on a display device coupled to the computing device. The visual presentation may include, for example, an interface (e.g., a display of a dashboard) to interact with a user (e.g., technician or customer).

Figure 4A:
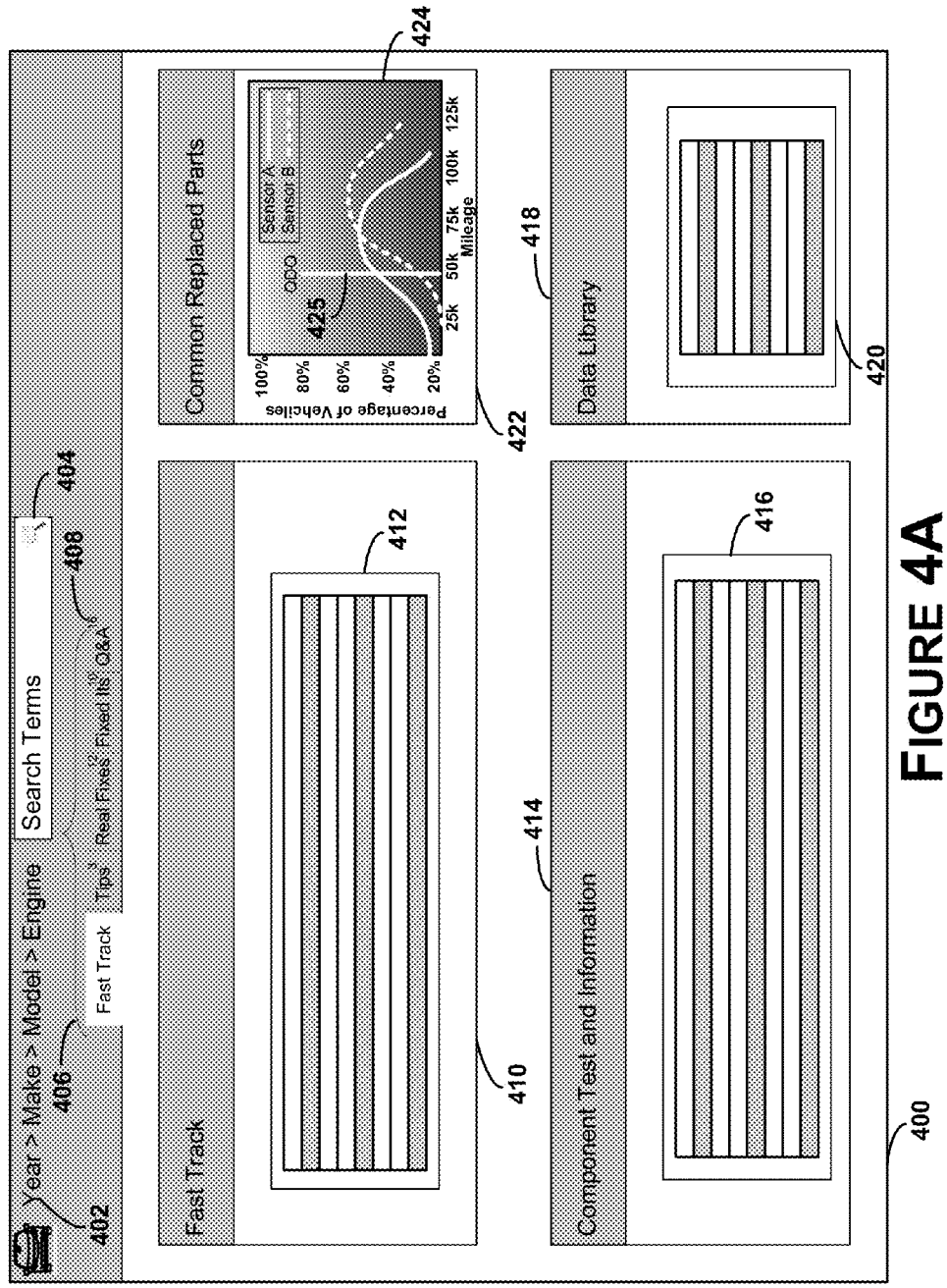
FIG. 4A illustrates an example interface for providing vehicle repair information, in accordance with an example embodiment.

FIG. 4A illustrates an example interface for providing vehicle repair information, in accordance with an example embodiment. A display of the interface 400 may be generated or visually presented by a computing device on a display device coupled to the computing device. As examples, the computing device 114, or the shop management computing device 116, described in FIGS. 1A-1B, or any other computing device that may be accessed by a technician assigned to repair a given vehicle or a customer requiring information on repairing the given vehicle may generate a display of the interface 400. The interface 400 may be, for example, a webpage or any other software interface display generated by executing instructions stored on a memory of the computing device. Information input through the interface 400 may be transmitted to a server over a network (e.g., the internet) and the server, accordingly, may be configured to provide through the network vehicle repair information to be displayed on the interface 400.

Vehicle identification information 402 such as year, make, model, odometer reading, and engine type of the vehicle may be specified for a vehicle. Also, a search term or search query may be input by way of a search terms input box 404, for example. Examples of search terms may include a DTC, a part name, test procedure, or any other search terms describing condition of the vehicle (e.g., describing a malfunction or a vehicle problem that the vehicle may be experiencing). Other information that may be input through the interface 400 may include geographic information relating to a geographic location of the vehicle (e.g., a zip code of a repair shop where the information is being input). Further, the user may be given an option (e.g., a drop down menu) to define or determine a region or a geographic boundary encompassing the location of the repair shop such as multiple States (e.g., Midwest, United States), State, county, city, a given region within a given distance, etc. Alternatively, the region may be predefined by the computing device (e.g., within a predetermine distance from the repair shop).

The server may, thus, receive through the network vehicle information including identification information for the vehicle and/or information describing condition of the vehicle as well as the geographic information. As described in the method 200, the server may match the vehicle information to content of a vehicle repair database and may, accordingly, provide through the communication network vehicle repair information corresponding to the identification information and the information describing the condition of the vehicle. Additionally, the information may be focused (e.g., region-specific) based on the geographic information.

The interface 400 may include several tabs 406 such as "Fast Track", "Tips", "Real Fixes", "Fixed Its", and "Q&A". These tabs are for illustration only, and other tabs are possible (e.g., "solutions", etc.). The "Tips" tab, for example, may provide general tips about a given vehicle part/component, or problem.

The "Real Fixes" tab, for example, may provide a list of repairs or potential vehicle fixes that fixed the malfunction on other vehicles that experienced the malfunction or on the vehicle on a previous occurrence of the malfunction. In an example, the list of repairs may be ranked from most likely to least likely fixes based on a number of vehicles reported to have a condition similar to the condition of the vehicle, and which were repaired using repairs of the list of repairs ranked. The ranking may be indicative of a successful fix count of each fix of the potential vehicle fixes, for example.

The "Fixed Its" tab, for example, may provide the successful fix count of each fix of the potential vehicle fixes shown in "Real Fixes". In an example, the technician may be provided with a list of the Real Fixes on the interface 400 and another list to pick whether a respective Real Fix has been successful or not. In another example, the technician may provide on a repair order a code that indicates whether a given fix of the Real Fixes has been successful. Such information (e.g., code or list picks) may be transmitted to the server, and the server may update the vehicle repair information (e.g., update a respective successful count in the "Fixed Its" tab) stored in the vehicle repair database to add this information.

The "Q&A" tab, for example, may provide most common questions and relevant answers associated with a given topic or the vehicle problem. Each tab may include a content indication 408 showing, for example, how many items are within each tab (e.g., how many fixes are available under the "Real Fixes" tab).

The "Fast Track" tab may provide, for example, a Fast Track block 410 including information 412 relevant to the vehicle information received. For example, if a DTC is specified, the information 410 may include information on definition of the DTC, description of the DTC, and general causes of the DTC.

The interface 400 may also include a component Tests and Information block 414 that may include component and test information 416. The component and test information 416 may include wiring diagrams, information identifying location of a failed component (e.g., associated with the DTC) in the vehicle, component specification, etc.

The interface 400 may also include a data library block 418 that may include library information 420. The library information 420 may include, for example, scan data images, oscilloscope waveforms, component photos, and other vehicle-specific images, documents and videos, etc.

The interface 400 further may include common replaced parts block 422. The common replaced parts block 422 may include, for example, a ranking of top replaced parts or failed components associated with the DTC or condition of the vehicle. The ranking may be based on a number of vehicles reported to have a similar condition to the condition of the vehicle, and may be indicative of successful fix count associated with replacing each component of the failed or replaced components, for example.

In an example, the common replaced parts block 422 may visually present a graph 424 depicting data that represents a percentage or a proportion of vehicles, based on a number of vehicles reported to have a condition similar to the condition of the vehicle, that replaced a failed part associated with the condition as a function of miles driven. The graph 424 shows an example of two sensors A and B and the percentage of vehicles that replaced the sensors as a function of mileage. The graph 424 also illustrates an odometer indication 425 representing the mileage driven by the vehicle as a way of indicating a probability that the vehicle may be repaired by replacing the sensors A and/or B based on the number of vehicles reported to have a condition similar to the condition of the vehicle.

Figure 4B:
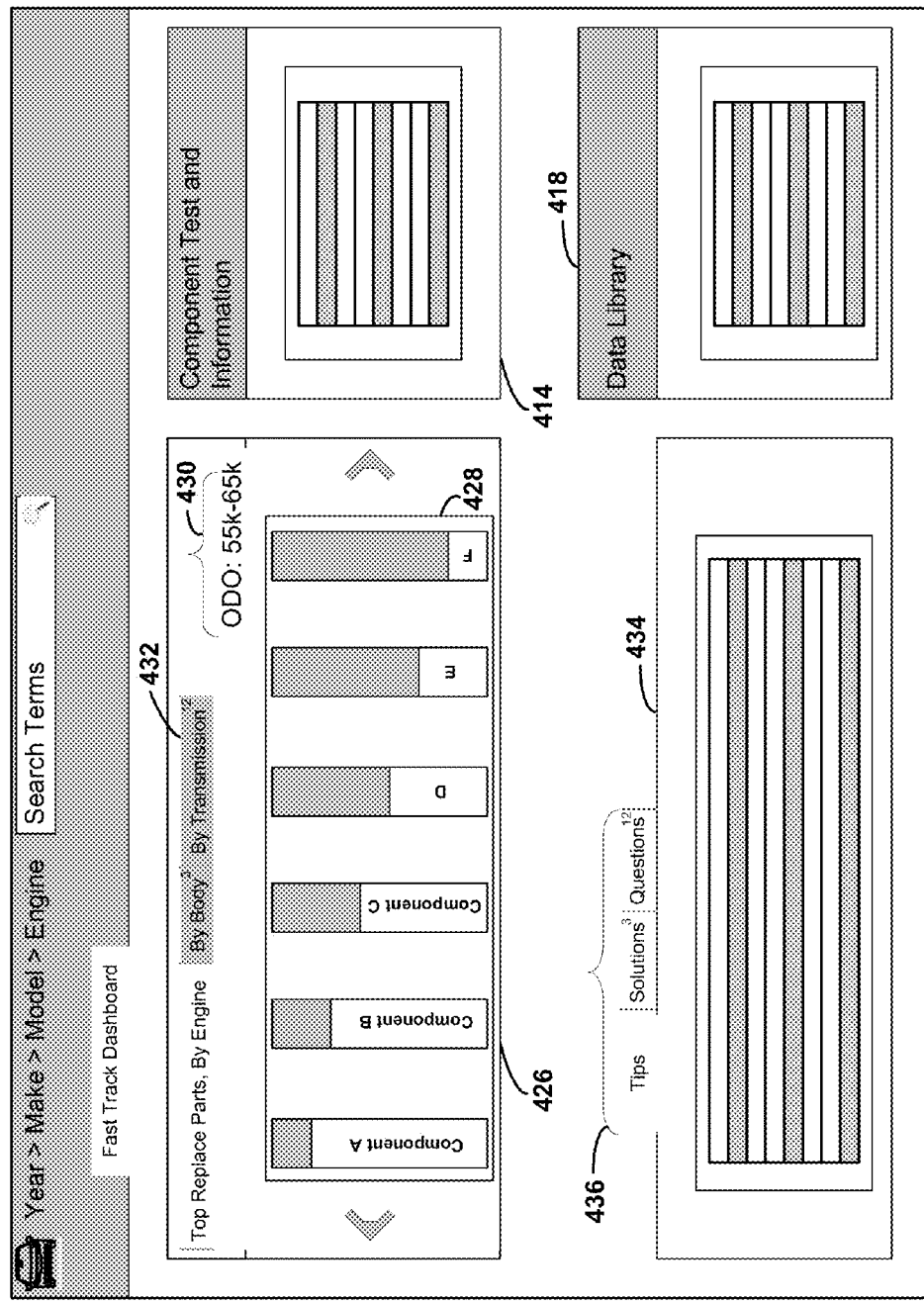
FIG. 4B illustrates another example interface for providing vehicle repair information, in accordance with an example embodiment.

FIG. 4B illustrates another example interface for providing vehicle repair information, in accordance with an example embodiment. The interface 400 in FIG. 4B includes a top replaced parts ranking block 426. The top replaced parts ranking block 426 may depict, for example, a bar graph 428 showing top replaced parts (or failed components) based on a number of vehicles reported to have a similar condition to the condition of the vehicle. The ranking may be indicative of successful fix count associated with replacing each part of the top replaced parts. For example, the bar graph 428 shows the ranking of components A-F for a given odometer reading or range 430. Categorization tabs 432 may allow presenting the bar graph 428 to show top replaced parts by engine type, body type, transmission type, year in which the vehicle was made, model year, geographic location relating to the vehicle, diagnostic trouble code (DTC), Parameter IDs (PIDs), sensor data, freeze frame data, or any other categorization. In an example, bars representing the components A-F in the bar graph 428 may be selectable by the user. Upon selecting one of the bars or component, more information about the selected component may be displayed such as the component and test information 416, the library information 420, and the graph 424 in FIG. 4A.

The interface 400 may also include tips, solutions, questions presented in block 434 and may also include the component test and information block 414 and the data library block 418 previously described in FIG. 4A.

In an example, the interface 400 may be configured to allow the technician or user of the interface 400 to provide feedback on the vehicle repair information received from the server. The feedback, for example, may be an indication of success or failure of one of the Real Fixes attempted to repair the vehicle. In an example, the technician or user may indicate whether the vehicle repair information is helpful in repairing the vehicle. In another example, the technician may provide comments and details related to technician's experience in using the vehicle repair information and also may provide improvements or updates that the technician may suggest to be added to the vehicle repair information provided by the server. The server may be configured to receive the feedback and update the vehicle repair database accordingly. For example, if a Real Fix, provided as part of the vehicle repair information, is successful in repairing the vehicle, the technician may provide an indication of the success, and the server may update the information in the "Fixed Its" tab accordingly.

In one example, the computing device used by the technician or user may be online (e.g., connected to the network) and continuously in connection with the server. In this example, the feedback may be sent in real-time or near real-time to the server when provided by the technician.

In another example, the computing device used by the technician or user may not be continuously connected with the server; instead a connection may be established periodically (e.g., every night). In this example, the feedback information may be stored locally (e.g., offline) at the computing device used by the technician and may be sent to the server when a connection is later established.

The layouts and examples in FIGS. 4A-4B are for illustration only. Other examples, layouts, data formats, graph formats, and arrangements are possible.

Figure 5:
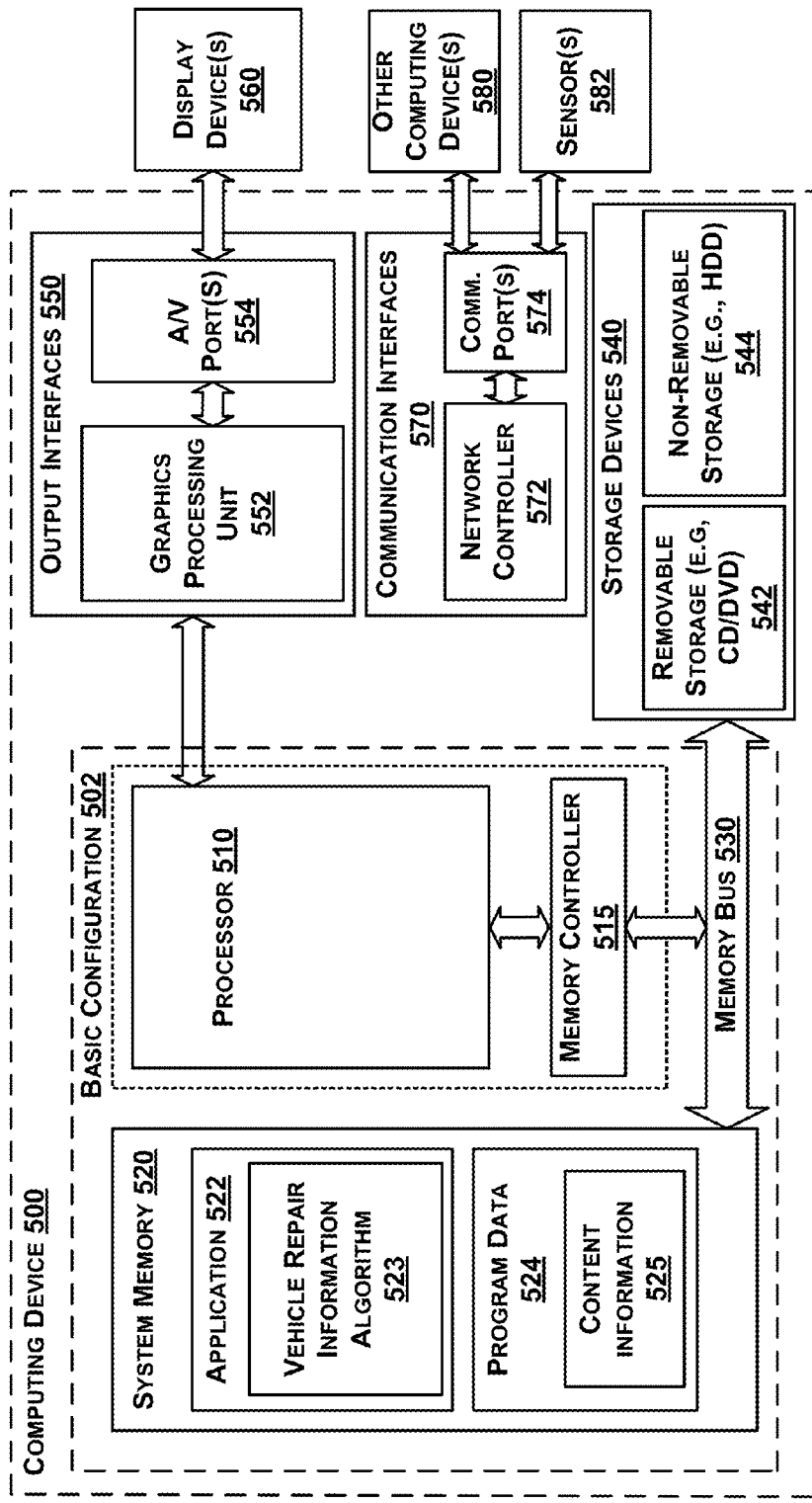
FIG. 5 is a functional block diagram illustrating an example computing device used in a computing system that is arranged in accordance with at least some embodiments described herein.

FIG. 5 is a functional block diagram illustrating an example computing device 500 used in a computing system that is arranged in accordance with at least some embodiments described herein. The computing device 500 may be a personal computer, mobile device, cellular phone, video game system, or global positioning system, and may be implemented as a client device, a server, a system, a combination thereof, or may be part of the system 100 shown in FIGS. 1A-1B. For example, the computing device 500 may describe the server 120, the computing device 114, or the shop management computing device 116 in FIG. 1B.

In a basic configuration 502, computing device 500 may include one or more processors 510 and system memory 520. A memory bus 530 can be used for communicating between the processor 510 and the system memory 520. Depending on the desired configuration, processor 510 can be of any type including but not limited to a microprocessor (μP), a microcontroller (μC), a digital signal processor (DSP), or any combination thereof. A memory controller 515 can also be used with the processor 510, or in some implementations, the memory controller 515 can be an internal part of the processor 510.

Depending on the desired configuration, the system memory 520 can be of any type including but not limited to volatile memory (such as RAM), non-volatile memory (such as ROM, flash memory, etc.) or any combination thereof. System memory 520 may include one or more applications 522, and program data 524. Application 522 may include vehicle repair information algorithm 523, in accordance with the present disclosure. Program Data 524 may include content information 525 that could be directed to any number of types of data. In some example embodiments, application 522 can be arranged to operate with program data 524 on an operating system.

Computing device 500 can have additional features or functionality, and additional interfaces to facilitate communications between the basic configuration 502 and other devices or components. For example, data storage devices 540 can be provided including removable storage devices 542, non-removable storage devices 544, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Computer storage media can include volatile and nonvolatile, non-transitory, removable and non-removable media implemented in any method or technology for storage of information, such as computer readable instructions, data structures, program modules, or other data.

System memory 520 and storage devices 540 are examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 500. Any such computer storage media can be part of device 500.

Computing device 500 can also include output interfaces 550 that may include a graphics processing unit 552, which can be configured to communicate to various external devices such as display devices 560 or speakers via one or more A/V ports 554 or a communication interface 570. The communication interface 570 may include a network controller 572, which can be arranged to facilitate communications with one or more other computing devices 580 over a network communication via one or more communication ports 574. As an example, the computing device 500 may represent a given basic configuration of the server 120 in FIG. 1B. In this example, the other computing devices 580 may include the computing device 114 or the shop management computing device 116. Alternatively, the computing device 500 may represent a respective basic configuration of the computing device 114 and the other computing devices 580 may include the shop management computing device 116 and the server 120, for example. The network controller 572 can also be arranged to facilitate communications with one or more sensors 582 (e.g., a GPS sensor). The one or more sensors 582 are shown external to the computing device 500, but may also be internal to the device. Communication media may be embodied by computer readable instructions, data structures, program modules, or other data in a modulated data signal, such as a carrier wave or other transport mechanism, and includes any information delivery media. A modulated data signal can be a signal that has one or more of its characteristics set or changed in such a manner as to encode information in the signal. By way of example, and not limitation, communication media can include wired media such as a wired network or direct-wired connection, and wireless media such as acoustic, radio frequency (RF), infrared (IR) and other wireless media.

Figure 6:
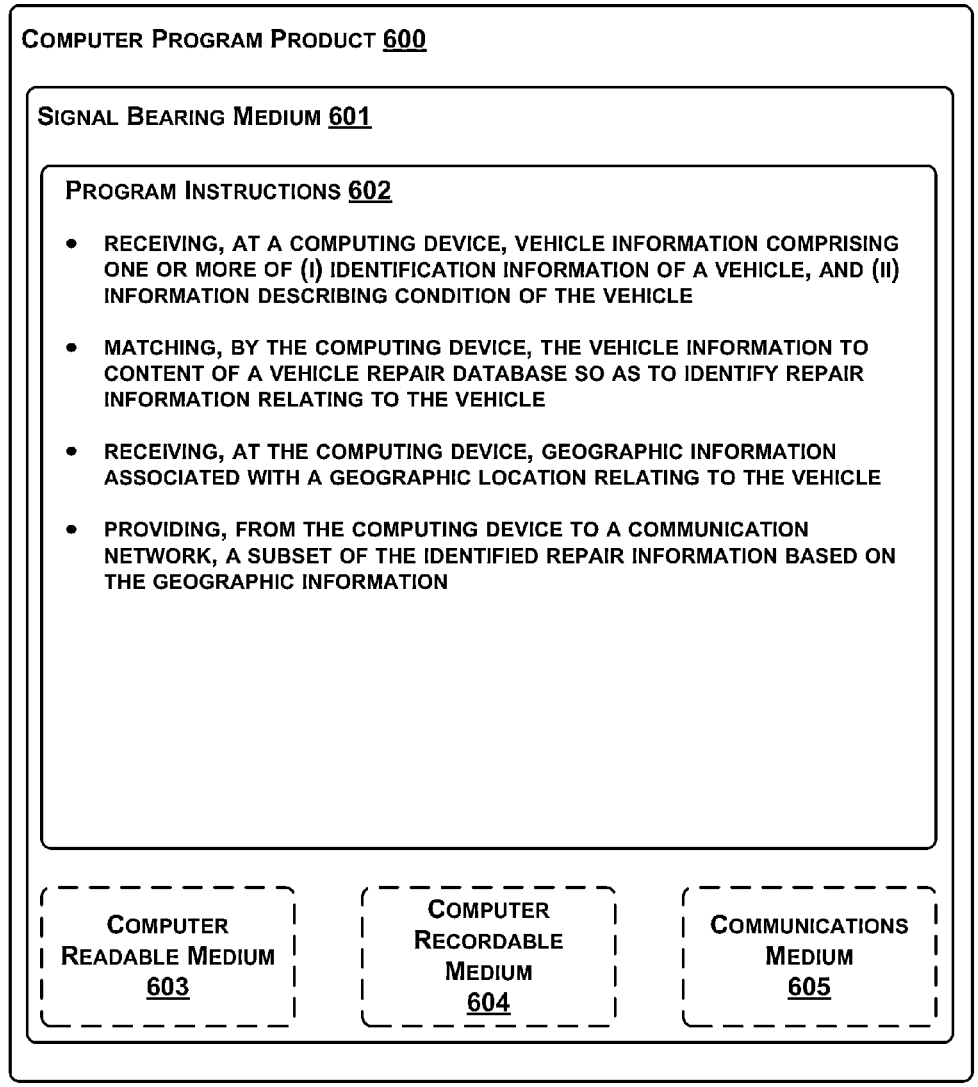
FIG. 6 is a schematic illustrating a conceptual partial view of an example computer program product that includes a computer program for executing a computer process on a computing device, arranged according to at least some embodiments presented herein.

In some embodiments, the disclosed methods may be implemented as computer program instructions encoded on a computer-readable storage media in a machine-readable format, or on other non-transitory media or articles of manufacture. FIG. 6 is a schematic illustrating a conceptual partial view of an example computer program product 600 that includes a computer program for executing a computer process on a computing device, arranged according to at least some embodiments presented herein. In one embodiment, the example computer program product 600 is provided using a signal bearing medium 601. The signal bearing medium 601 may include one or more program instructions 602 that, when executed by one or more processors may provide functionality or portions of the functionality described above with respect to FIGS. 1-5. Thus, for example, referring to the embodiments shown in FIGS. 2 and 3, one or more features of blocks 302-208 and 302-306 may be undertaken by one or more instructions associated with the signal bearing medium 601. In addition, the program instructions 602 in FIG. 6 describe example instructions as well.

In some examples, the signal bearing medium 601 may encompass a computer-readable medium 603, such as, but not limited to, a hard disk drive, a Compact Disc (CD), a Digital Video Disk (DVD), a digital tape, memory, etc. In some implementations, the signal bearing medium 801 may encompass a computer recordable medium 604, such as, but not limited to, memory, read/write (R/W) CDs, R/W DVDs, etc. In some implementations, the signal bearing medium 601 may encompass a communications medium 605, such as, but not limited to, a digital and/or an analog communication medium (e.g., a fiber optic cable, a waveguide, a wired communications link, a wireless communication link, etc.). Thus, for example, the signal bearing medium 601 may be conveyed by a wireless form of the communications medium 605 (e.g., a wireless communications medium conforming to the IEEE 802.11 standard or other transmission protocol).

The one or more programming instructions 602 may be, for example, computer executable and/or logic implemented instructions. In some examples, a computing device such as the computing device 500 of FIG. 5 may be configured to provide various operations, functions, or actions in response to the programming instructions 602 conveyed to the computing device 500 by one or more of the computer readable medium 603, the computer recordable medium 604, and/or the communications medium 605. It should be understood that arrangements described herein are for purposes of example only. As such, those skilled in the art will appreciate that other arrangements and other elements (e.g. machines, interfaces, functions, orders, and groupings of functions, etc.) can be used instead, and some elements may be omitted altogether according to the desired results. Further, many of the elements that are described are functional entities that may be implemented as discrete or distributed components or in conjunction with other components, in any suitable combination and location.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims, along with the full scope of equivalents to which such claims are entitled. It is also to be understood that the terminology used herein is for the purpose of describing particular embodiments only, and is not intended to be limiting.

Since many modifications, variations, and changes in detail can be made to the described embodiments, it is intended that all matters in the preceding description and shown in the accompanying drawings be interpreted as illustrative and not in a limiting sense. It is intended to be understood that the following clauses further describe aspects of the present application.

(1) A method, comprising:

receiving, at a computing device, vehicle information comprising one or more of (i) identification information of a vehicle, and (ii) information describing condition of the vehicle;

matching, by the computing device, the vehicle information to content of a vehicle repair database so as to identify repair information relating to the vehicle;

receiving, at the computing device, geographic information identifying a geographic location relating to the vehicle; and providing, from the computing device to a communication network, a subset of the identified repair information based on the geographic information.

(2) The method of clause (1), wherein the identification information includes one or more of: (i) year in which the vehicle was made, (ii) model year, (iii) make of the vehicle, (iv) model of the vehicle, (v) engine type of the vehicle, and (vi) vehicle identification number, and wherein the information describing condition of the vehicle includes one or more of: (vii) odometer reading of the vehicle, (viii) a diagnostic trouble code (DTC), (ix) a symptom of a malfunction of the vehicle, (x) Parameter IDs (PIDs) and PID values, (xi) sensor data, and (xii) freeze frame data.

(3) The method of clause (1) or (2), wherein the geographic information includes an altitude of the geographic location relating to the vehicle.

(4) The method of clause (1), (2), or (3), further comprising receiving information associated with a region with an altitude similar to a given altitude at a given location of the vehicle, wherein providing the subset of the identified repair information is based on the information associated with the region.

(5) The method of clause (1), (2), (3), or (4), wherein the geographic information includes information identifying an original sale location of the vehicle.

(6) The method of clause (1), (2), (3), (4), or (5), wherein the geographic information includes historical geographic information identifying locations at which the vehicle was driven.

(7) The method of clause (1), (2), (3), (4), (5), or (6), the geographic location relating to the vehicle is a location with weather conditions similar to given weather conditions at a given location of the vehicle.

(8) The method of clause (1), (2), (3), (4), (5), (6), or (7), wherein the geographic information includes information identifying a location of a repair shop where the vehicle is being repaired.

(9) The method of clause (1), (2), (3), (4), (5), (6), (7), or (8), wherein the geographic location relating to the vehicle is a location with weather conditions similar to given weather conditions at a given location of the vehicle on a date on which: (i) the vehicle experienced a given malfunction, or (ii) the vehicle is being repaired.

(10) The method of clause (1), (2), (3), (4), (5), (6), (7), (8), or (9), wherein providing the subset of repair information comprises providing a ranking of top replaced parts for the vehicle based on the vehicle information and the geographic location, wherein the ranking is indicative of successful fix count associated with replacing each part of the top replaced parts.

(11) The method of clause (1), (2), (3), (4), (5), (6), (7), (8), (9), or (10), wherein the vehicle information includes the information describing condition of the vehicle, and wherein providing the subset of the identified repair information comprises providing a ranking of potential vehicle fixes to a given malfunction based on a number of vehicles reported to have a condition similar to the condition of the vehicle, wherein the ranking is indicative of successful fix count of each fix of the potential vehicle fixes.

(12) The method of clause (11) wherein providing the ranking comprises providing a given ranking of replaced components based on one or more of: (i) odometer reading, (ii) engine type of the vehicle, (iii) transmission type of the vehicle, (iv) body type of the vehicle, (v) year in which the vehicle was made, (vi) a model year, (vii) the geographic location relating to the vehicle, (viii) diagnostic trouble code (DTC), (ix) Parameter IDs (PIDs), (x) sensor data, and (xi) freeze frame data.

(13) The method of clause (1), (2), (3), (4), (5), (6), (7), (8), (9), (10), (11) or (12), wherein the vehicle information includes the information describing condition of the vehicle, and wherein providing the subset of the identified repair information comprises providing data representing a percentage of vehicles, based on a number of vehicles reported to have a condition similar to the condition of the vehicle, that replaced a failed part associated with the condition as a function of miles driven.

(14) The method of clause (13), further comprising providing in the data an indication of a current odometer reading of the vehicle.

(15) A non-transitory computer readable medium having stored thereon instructions executable by a computing device to cause the computing device to perform functions comprising:

receiving, from a communication network, vehicle information comprising one or more of (i) identification information of a vehicle, and (ii) information describing condition of the vehicle;

matching the vehicle information to content of a vehicle repair database so as to identify repair information relating to the vehicle;

receiving, from the communication network, geographic information identifying a geographic location relating to the vehicle; and providing, to the communication network, a subset of the identified repair information based on the geographic information.

(16) The non-transitory computer readable medium of clause (15), wherein the function of providing the subset of repair information comprises:

providing data representing a proportion of vehicles, based on a number of vehicles reported to have a condition similar to the condition of the vehicle, that replaced a failed component associated with the condition as a function of miles driven; and providing in the data an indication of miles driven by the vehicle.

(17) The non-transitory computer readable medium of clause (15) or (16), wherein receiving the geographic information includes receiving information associated with a geographic region with weather conditions similar to given weather conditions at a given location of the vehicle.

(18) A system, comprising:

a vehicle repair database including one or more of (i) information relating to prior experience of repairing vehicles, and (ii) original equipment manufacturer vehicle information including component-specific information; and a computing device coupled to the vehicle repair database, wherein the computing device includes a non-transitory computer readable storage device storing computer readable instructions, a processor configured to execute the computer readable instructions, and a communication device configured to transmit data to a communication network and to receive given data from the communication network, and wherein the computing device is configured to:

receive, from the communication network, vehicle information comprising one or more of (i) identification information of a vehicle, and (ii) information describing condition of the vehicle;

identify repair information relating to the vehicle based on matching of the vehicle information to content of the vehicle repair database;

receive, from the communication network, geographic information identifying a geographic location relating to the vehicle; and provide, to the communication network, a subset of the identified repair information based on the geographic information.

(19) The system of clause (18), wherein the geographic location relating to the vehicle has one or more of (i) an altitude similar to a given altitude at a given location of the vehicle, and (ii) weather conditions similar to given weather conditions at the given location of the vehicle or similar to respective weather conditions on a date on which the vehicle experienced a given malfunction or is being repaired.

(20) The system of clause (18) or (19), wherein the computing device is further configured to provide data representing a ranking of failed components based on a number of vehicles reported to have a similar condition to the condition of the vehicle, wherein the ranking is indicative of successful fix count associated with replacing each component of the failed components, and wherein the ranking is based on one or more of: (i) odometer reading, (ii) engine type of the vehicle, (iii) transmission type of the vehicle, (iv) body type of the vehicle, (v) year in which the vehicle was made, (vi) a model year, (vii) the geographic location relating to the vehicle, (viii) diagnostic trouble code (DTC), (ix) Parameter IDs (PIDs), (x) sensor data, and (xi) freeze frame data.

(21) The system of clause (18), (19), or (20), wherein the computing device is further configured to:
receive repair order information for the vehicle;
determine the geographic location relating to the vehicle from the repair order information;
transmit, to the communication network, a request for weather information for the determined geographic location;
receive, from the communication network, the weather information for the determined geographic location, based on the request;
associate the weather information with the repair order information; and
store the repair order information with the associated weather information.

(22) A method, comprising:
providing to a communication network, by a computing device, vehicle information comprising one or more of (i) identification information of a vehicle, and (ii) information describing condition of the vehicle;
providing to the communication network, by the computing device, geographic information identifying a geographic location relating to the vehicle; and
receiving from the communication network, at the computing device, repair information based on the vehicle information and the geographic information.

(23) The method of clause (22), wherein the identification information includes one or more of: (i) year in which the vehicle was made, (ii) model year, (iii) make of the vehicle, (iv) model of the vehicle, (v) engine type of the vehicle, (vi) vehicle identification number, and wherein the information describing the condition of the vehicle includes one or more of: (vii) odometer reading of the vehicle, (viii) diagnostic trouble codes (DTC), (ix) a symptom of a malfunction of the vehicle, (x) Parameter IDs (PIDs) and PID values, (xi) sensor data, and (xii) freeze frame data.

(24) The method of clause (22) or (23), further comprising visually presenting the repair information on a display device coupled to the computing device.

(25) The method of clauses (22), (23), or (24), wherein receiving the repair information comprises receiving a ranking of top replaced parts for the vehicle based on the vehicle information and the geographic location, wherein the ranking is indicative of successful fix count associated with replacing each part of the top replaced parts, the method further comprising visually presenting the ranking on a display device coupled to the computing device.

(26) The method of clause (22), (23), (24), or (25), wherein receiving the repair information comprises receiving a ranking of replaced components based on a number of vehicles reported to have a condition similar to the condition of the vehicle, wherein the ranking is indicative of successful fix count associated with replacing each component of the replaced components.

(27) The method of clause (26), wherein the ranking is based on one or more of: (i) odometer reading, (ii) engine type of the vehicle, (iii) transmission type of the vehicle, and (iv) body type of the vehicle, (v) year in which the vehicle was made, (vi) a model year, (vii) the geographic location relating to the vehicle, (viii) diagnostic trouble code (DTC), (ix) Parameter IDs (PIDs), (x) sensor data, and (xi) freeze frame data.

(28) A system, comprising:
a display device; and
a computing device coupled to the display device, wherein the computing device includes a non-transitory computer readable storage device storing computer readable instructions, a processor configured to execute the computer readable instructions, and a communication device configured to transmit data to a communication network and to receive given data from the communication network, and wherein the computing device is configured to:
provide, to the communication network, vehicle information comprising one or more of (i) identification information of a vehicle, and (ii) information describing condition of the vehicle;
provide, to the communication network, geographic information identifying a geographic location relating to the vehicle;
receive, from the communication network, repair information based on the vehicle information and the geographic information; and
generate a display of the repair information on the display device.

(29) The system of clause (28), further comprising a Global Positioning System (GPS) sensor coupled to the computing device and configured to provide to the computing device the geographic information identifying the geographic location of the vehicle or the computing device.

(30) The system of clause (28) or (29), wherein the computing device is configured to receive the repair information as data representing a percentage or a proportion of vehicles, based on a number of vehicles reported to have a condition similar to the condition of the vehicle, that replaced a failed part associated with the condition as a function of miles driven.

(31) The system of clause (30), wherein the computing device is further configured to:
generate a display of a graph depicting the data on the display device; and visually present an indication of a current odometer reading of the vehicle overlaying the graph.

What is claimed is:

1. A method, comprising:
receiving, at a computing device, vehicle information comprising (i) a vehicle identifier that identifies a vehicle, and (ii) information that describes a condition of the vehicle;
matching, by the computing device, the vehicle information to content of a vehicle repair database so as to identify repair information that pertains to the vehicle;
receiving, at the computing device, geographic information that identifies a geographic location related to a current or prior location of the vehicle;
identifying within the repair information a subset of repair information that is specific to the described condition as experienced by other vehicles at the geographic location related to the current or prior location of the vehicle; and
providing, from the computing device to a communication network, the subset of repair information.

2. The method of claim 1, wherein the vehicle identifier includes one or more of: (i) year in which the vehicle was made, (ii) model year, (iii) make of the vehicle, (iv) model of the vehicle, (v) engine type of the vehicle, and (vi) vehicle identification number, and wherein the information that describes the condition of the vehicle includes one or more of: (vii) odometer reading of the vehicle, (viii) a diagnostic trouble code (DTC), (ix) a symptom of a malfunction of the vehicle, (x) Parameter IDs (PIDs) and PID values, (xi) sensor data, and (xii) freeze frame data.

3. The method of claim 1, wherein the geographic information defines an altitude of the geographic location related to the current or prior location of the vehicle.

4. The method of claim 1, wherein the geographic location related to the current or prior location of the vehicle comprises a region with an altitude similar to a given altitude at the current or prior location of the vehicle, wherein identifying the subset of repair information is based on the altitude at the region.

5. The method of claim 1, wherein the prior location of the vehicle is an original sale location of the vehicle.

6. The method of claim 1, wherein the prior location of the vehicle identifies a location at which the vehicle was previously driven.

7. The method of claim 1, wherein the geographic location related to the current or prior location of the vehicle is a location with weather conditions similar to given weather conditions at the current or prior location of the vehicle.

8. The method of claim 1, wherein the geographic location related to the current or prior location of the vehicle is a location of a repair shop where the vehicle is being repaired.

9. The method of claim 1, wherein the geographic location related to the current or prior location of the vehicle is a location with weather conditions similar to given weather conditions at the current or prior location of the vehicle on a date on which: (i) the vehicle experienced a given malfunction, or (ii) the vehicle is being repaired.

10. The method of claim 1, wherein providing the subset of repair information comprises providing a ranking of top replaced parts for the vehicle based on the vehicle information and the geographic location related to the current or prior location of the vehicle, wherein the ranking is indicative of successful fix count associated with replacing each part of the top replaced parts.

11. The method of claim 1, wherein providing the subset of repair information comprises providing a ranking of potential vehicle fixes to a given malfunction based on a number of the other vehicles reported to have a condition similar to the condition of the vehicle, wherein the ranking is indicative of successful fix count of each fix of the potential vehicle fixes.

12. The method of claim 11, wherein providing the ranking comprises providing a given ranking of replaced components based on one or more of: (i) odometer reading, (ii) engine type of the vehicle, (iii) transmission type of the vehicle, (iv) body type of the vehicle, (v) year in which the vehicle was made, (vi) a model year, (vii) the geographic location related to the current or prior location of the vehicle, (viii) diagnostic trouble code (DTC), (ix) Parameter IDs (PIDs), (x) sensor data, and (xi) freeze frame data.

13. The method of claim 1, wherein providing the subset of the identified repair information comprises providing data representing a percentage of vehicles, based on a number of the other vehicles reported to have a condition similar to the condition of the vehicle, that replaced a failed part associated with the condition as a function of miles driven.

14. The method of claim 13, further comprising providing in the data an indication of a current odometer reading of the vehicle.

15. A non-transitory computer readable medium having stored thereon instructions executable by a computing device to cause the computing device to perform functions comprising:
receiving, from a communication network, vehicle information comprising (i) a vehicle identifier that identifies a vehicle, and (ii) information that describes a condition of the vehicle;
matching the vehicle information to content of a vehicle repair database so as to identify repair information that pertains to the vehicle;
receiving, from the communication network, geographic information that identifies a geographic location related to a current or prior location of the vehicle;
identifying within the repair information a subset of repair information that is specific to the described condition as experienced by other vehicles at the geographic location related to the current or prior location of the vehicle; and
providing, to the communication network, the subset of repair information.

16. The non-transitory computer readable medium of claim 15, wherein the function of providing the subset of repair information comprises:
providing data representing a proportion of vehicles, based on a number of the other vehicles reported to have a condition similar to the condition of the vehicle, that replaced a failed component associated with the condition as a function of miles driven; and
providing in the data an indication of miles driven by the vehicle.

17. The non-transitory computer readable medium of claim 15, wherein the geographic location related to the current or prior location of the vehicle comprises a geographic region with weather conditions similar to given weather conditions at the current or prior location of the vehicle.

18. A system, comprising:
one or more processors; and
memory configured to store instructions, that when executed by the one or more processors, cause the system to perform functions comprising:
receiving, from a communication network, vehicle information comprising (i) a vehicle identifier that identifies a vehicle, and (ii) information that describes a condition of the vehicle;
matching the vehicle information to content of a vehicle repair database so as to identify repair information that pertains to the vehicle;
receiving, from the communication network, geographic information that identifies a geographic location related to a current or prior location of the vehicle;
identifying within the repair information a subset of repair information that is specific to the described condition as experienced by other vehicles at the geographic location related to the current or prior location of the vehicle; and
providing, to the communication network, the subset of repair information based on the geographic information.

19. The system of claim 18, wherein the vehicle identifier includes one or more of: (i) year in which the vehicle was made, (ii) model year, (iii) make of the vehicle, (iv) model of the vehicle, (v) engine type of the vehicle, and (vi) vehicle identification number, and wherein the information that describes the condition of the vehicle includes one or more of: (vii) odometer reading of the vehicle, (viii) a diagnostic trouble code (DTC), (ix) a symptom of a malfunction of the vehicle, (x) Parameter IDs (PIDs) and PID values, (xi) sensor data, and (xii) freeze frame data.

20. The system of claim 18, wherein the geographic information defines an altitude of the geographic location related to the current or prior location of the vehicle.

21. The system of claim 18, wherein the geographic location related to the current or prior location of the vehicle comprises a region with an altitude similar to a given altitude at the current or prior location of the vehicle, wherein the function of identifying the subset of repair information comprises identifying the subset based on the altitude at the region.

22. The system of claim 18, wherein the prior location of the vehicle is an original sale location of the vehicle.

23. The system of claim 18, wherein the prior location of the vehicle identifies a location at which the vehicle was driven.

24. The system of claim 18, wherein the geographic location related to the current or prior location of the vehicle is a location having weather conditions similar to given weather conditions at the current or prior location of the vehicle.

25. The system of claim 18, wherein the geographic location related to the current or prior location of the vehicle is a location of a repair shop where the vehicle is being repaired.

26. The system of claim 18, wherein the geographic location related to the current or prior location of the vehicle is a location having weather conditions similar to given weather conditions at the current or prior location of the vehicle on a date on which: (i) the vehicle experienced a given malfunction, or (ii) the vehicle is being repaired.

27. The system of claim 18, wherein the function of providing the subset of repair information comprises providing a ranking of top replaced parts for the vehicle based on the vehicle information and the geographic location related to the current or prior location of the vehicle, wherein the ranking is indicative of successful fix count associated with replacing each part of the top replaced parts.

28. The system of claim 18, wherein the function of providing the subset of repair information comprises:
providing a ranking of potential vehicle fixes to a given malfunction based on a number of the other vehicles reported to have a condition similar to the condition of the vehicle, wherein the ranking is indicative of successful fix count of each fix of the potential vehicle fixes.

29. The system of claim 28, wherein the function of providing the ranking comprises:
providing a given ranking of replaced components based on one or more of: (i) odometer reading, (ii) engine type of the vehicle, (iii) transmission type of the vehicle, (iv) body type of the vehicle, (v) year in which the vehicle was made, (vi) a model year, (vii) the geographic location related to the current or prior location of to the vehicle, (viii) diagnostic trouble code (DTC), (ix) Parameter IDs (PIDs), (x) sensor data, and (xi) freeze frame data.

30. The system of claim 18, wherein the function of providing the subset of the identified repair information comprises:
providing data representing a percentage of vehicles, based on a number of the other vehicles reported to have a condition similar to the condition of the vehicle, that replaced a failed part associated with the condition as a function of miles driven.

31. The system of claim 30, wherein the functions further comprise:
providing in the data an indication of a current odometer reading of the vehicle.

* * * * *